(12) United States Patent
Nguyen et al.

(10) Patent No.: US 8,717,194 B2
(45) Date of Patent: May 6, 2014

(54) LED TRAFFIC SIGNAL COMPENSATION AND PROTECTION METHODS

(75) Inventors: Truong-Khoa Nguyen, Lachine (CA); Benoit Essiambre, Lachine (CA); Michel Doss, Lachine (CA); Christian Poirier, Lachine (CA); Morné Neser, Lachine (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 358 days.

(21) Appl. No.: 12/974,449

(22) Filed: Dec. 21, 2010

(65) Prior Publication Data

US 2012/0154176 A1      Jun. 21, 2012

(51) Int. Cl.
   *G08G 1/095*   (2006.01)
   *H05B 37/03*   (2006.01)

(52) U.S. Cl.
   CPC .............. *H05B 37/03* (2013.01); *G08G 1/095* (2013.01)
   USPC .......................................... 340/907; 340/931

(58) Field of Classification Search
   CPC ......... G08G 1/095; G08G 1/07; H05B 37/03; H05B 37/04
   USPC .......................................................... 340/907
   See application file for complete search history.

(56) References Cited

U.S. PATENT DOCUMENTS

| | | |
|---|---|---|
| 4,645,919 A | 2/1987 | McCaleb |
| 5,260,584 A | 11/1993 | Popson et al. |
| 5,765,940 A | 6/1998 | Levy et al. |
| 6,086,220 A | 7/2000 | Lash et al. |
| 6,111,739 A | 8/2000 | Wu et al. |
| 6,207,946 B1 | 3/2001 | Jusoh et al. |
| 6,236,331 B1* | 5/2001 | Dussureault ............. 340/815.45 |
| 6,272,269 B1 | 8/2001 | Naum |
| 6,621,239 B1 | 9/2003 | Belliveau |
| 6,856,103 B1 | 2/2005 | Hudson et al. |
| 7,242,702 B2 | 7/2007 | Kopp et al. |
| 7,274,302 B2 | 9/2007 | Stevenson et al. |
| 7,425,798 B2* | 9/2008 | St.-Germain .................. 315/129 |

(Continued)

FOREIGN PATENT DOCUMENTS

| | | |
|---|---|---|
| EP | 0362993 | 4/1990 |
| EP | 0460719 | 12/1991 |

(Continued)

OTHER PUBLICATIONS

EP 11 19 3935 Search Report.

*Primary Examiner* — Kerri McNally
(74) *Attorney, Agent, or Firm* — Fay Sharpe LLP

(57) ABSTRACT

According to one aspect of the present disclosure, systems and methods for monitoring one or more operating parameters of a traffic lamp and adjusting light output of one or more light sources thereof to correct for one or more degradation factors are provided. According to another aspect of the present disclosure, systems and methods for monitoring one or more operating parameters of a traffic lamp and generating an indication if end of life is detected with the traffic lamp, where end of life is determined based on the one or more operating parameters. According to another aspect of the present disclosure, systems and methods for monitoring one or more operating parameters of a traffic lamp and entering the traffic lamp into a self-protected mode if a fault is detected with the one or more operating parameters.

17 Claims, 2 Drawing Sheets

(56) References Cited

U.S. PATENT DOCUMENTS

| | | |
|---|---|---|
| 7,482,756 B2 | 1/2009 | Kesterson |
| 7,488,097 B2 | 2/2009 | Reisenauer et al. |
| 7,633,037 B2 | 12/2009 | Hoffman |
| 2002/0122309 A1 | 9/2002 | Abdelhafez et al. |
| 2003/0015973 A1* | 1/2003 | Ovens et al. ............... 315/291 |
| 2004/0212309 A1 | 10/2004 | St.-Germain |
| 2005/0117327 A1 | 6/2005 | Gupta |
| 2005/0206529 A1 | 9/2005 | St.-Germain |
| 2006/0232995 A1 | 10/2006 | Wu et al. |
| 2008/0224966 A1 | 9/2008 | Cok et al. |
| 2008/0231201 A1 | 9/2008 | Higley et al. |
| 2009/0021187 A1 | 1/2009 | Bhagat |
| 2009/0086498 A1 | 4/2009 | Condon et al. |
| 2010/0060171 A1 | 3/2010 | Goitiandia et al. |
| 2010/0315004 A1* | 12/2010 | Horng et al. ............... 315/117 |

FOREIGN PATENT DOCUMENTS

| | | |
|---|---|---|
| EP | 0830719 | 8/1999 |
| EP | 1112199 | 1/2008 |
| EP | 2012559 | 1/2009 |
| EP | 2079276 | 7/2009 |
| WO | WO 03/009647 | 1/2003 |

\* cited by examiner

LED TRAFFIC SIGNAL COMPENSATION AND PROTECTION METHODS

BACKGROUND

The present exemplary embodiments relate generally to lighting. They find particular application in conjunction with traffic lamps, and will be described with particular reference thereto. However, it is to be appreciated that the present exemplary embodiments are also amenable to other like applications.

Traffic signals are typically disposed along roads to control the flow of traffic and/or make intersections more visible. Traffic signals may also be employed to provide warning to motorists, such as at railroad crossings. Traffic signals may include one or more traffic lamps, each having one or more light sources, such as LEDs, disposed therein. Typical colors used in traffic lamps include red, yellow and green.

One problem with traffic lamps is that light sources, such as LEDs, may degrade with temperature and age. In other words, the light output of a light source may diminish with temperature and age. Reduction in light output can make traffic signals less noticeable, thereby increasing the likelihood of accidents.

Known solutions to this degradation only compensate for temperature degradation. Namely, known solutions can maintain light output at a constant level through the operating temperature range of a traffic lamp, but they cannot maintain light output at a constant level through the lifetime of a traffic lamp. As a general matter, this is because known solutions are lacking monitoring and/or logging capability of operating parameters. They cannot track the usage of a traffic lamp.

Another problem with traffic lamps is that they are often used improperly outside of the operating specifications, which can lead to overheating and/or malfunction. Overheating can cause numerous problems, which places the safety of motorists at risk. For example, in situations in which a traffic lamp is used to make an intersection more visible and/or control the flow of traffic, a failure of the traffic lamp can lead to collisions.

Known solutions to this misuse of traffic lamps use passive circuits to mitigate overheating and/or malfunction. However, there are limitations with using passive circuits to mitigate overheating. For example, passive circuits cannot take affirmative action to avoid overheating and/or malfunction. As another example, passive circuits generally cannot log and/or monitor the operating conditions of a traffic lamp.

Another problem with traffic lamps is that they often reach the end of their life without any indication to an operator thereof. End of life means a traffic lamp has reached the point where light output can no longer be guaranteed. Similar to improperly using a traffic lamp, failure to replace a lamp when it reaches the end of its life can be dangerous.

Known solutions to this problem use a light sensing device in order to sense degradation of a traffic lamp. When light is detected below a certain level, a circuit blows an input fuse. However, blowing the fuse completely disables the lamp until the fuse is replaced, notwithstanding that it may have still been working, albeit at a less than optimal level. Further, blowing the fuse requires replacement of what may have been a perfectly good fuse.

The present disclosure contemplates new and improved systems and/or methods for remedying this and other problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a traffic lamp is provided. The traffic lamp includes one or more light sources, one or more sensors, one or more memory modules, an end of life indication interface, and a controller. The controller actively monitors one or more operating parameters of the traffic lamp using the sensors and enters the traffic lamp into a self-protected mode if a fault is detected with the one or more operating parameters.

According to another aspect of the present disclosure, a traffic lamp is provided. The traffic lamp includes one or more light sources, one or more sensors, one or more memory modules, an end of life indication interface, and a controller. The controller monitors one or more operating parameters of the traffic lamp and generates an indication if end of life is detected with the traffic lamp. End of life is determined based on the operating parameters to maintain a constant light output level of the light sources.

According to another aspect of the present disclosure, a traffic lamp is provided. The traffic lamp includes one or more light sources, one or more sensors, one or more memory modules, an end of life indication interface, and a controller. The controller monitors one or more operating parameters of the traffic lamp and logs at least one of the one or more operating parameters to the memory. Further, the controller adjusts light output of the one or more light sources to correct for one or more degradation factors based on the one or more operating parameters

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
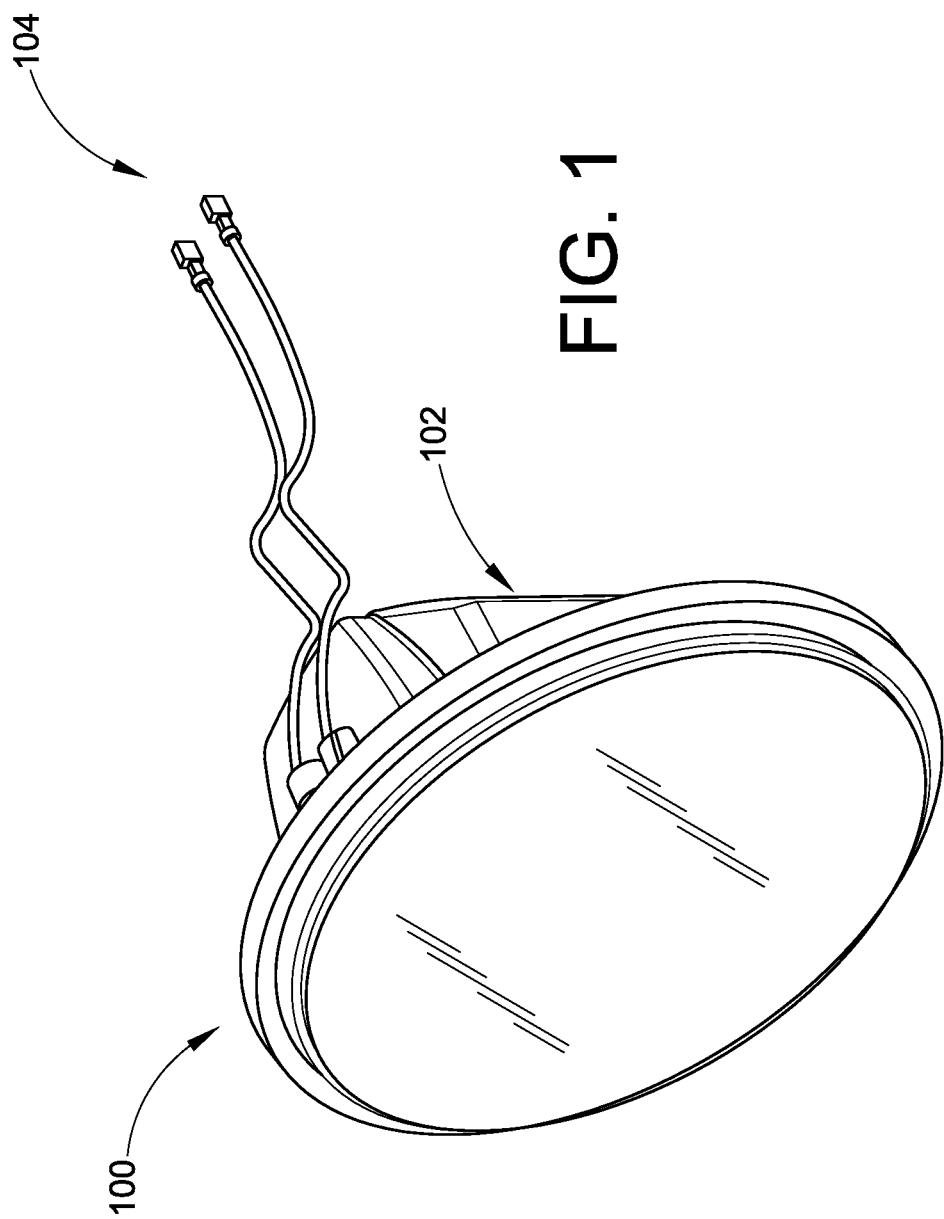
FIG. 1 is a perspective view of a traffic lamp according to aspects of the present disclosure; and, FIG. 2 is a block diagram of traffic lamp electronics according to aspects of the present disclosure.

One or more embodiments or implementations are hereinafter described in conjunction with the drawings, where like reference numerals are used to refer to like elements throughout, and where the various features are not necessarily drawn to scale.

With reference to FIG. 1, an illustrative embodiment of a traffic lamp 100 according to aspects of the present disclosure is provided. The illustrated traffic lamp 100 is typical of what one would find overhanging an intersection. Other embodiments of the traffic lamp 100 are, however, contemplated. The traffic lamp 100 includes a housing 102 and one or more connectors 104. The connectors 104 are provisioned to receive electrical power and, in certain embodiments, control commands from an external source (not shown), such as a traffic controller. Disposed within the housing 102, the traffic lamp 100 includes traffic lamp electronics 106, shown in FIG. 2, for monitoring operating parameters the traffic lamp 100.

Figure 2:
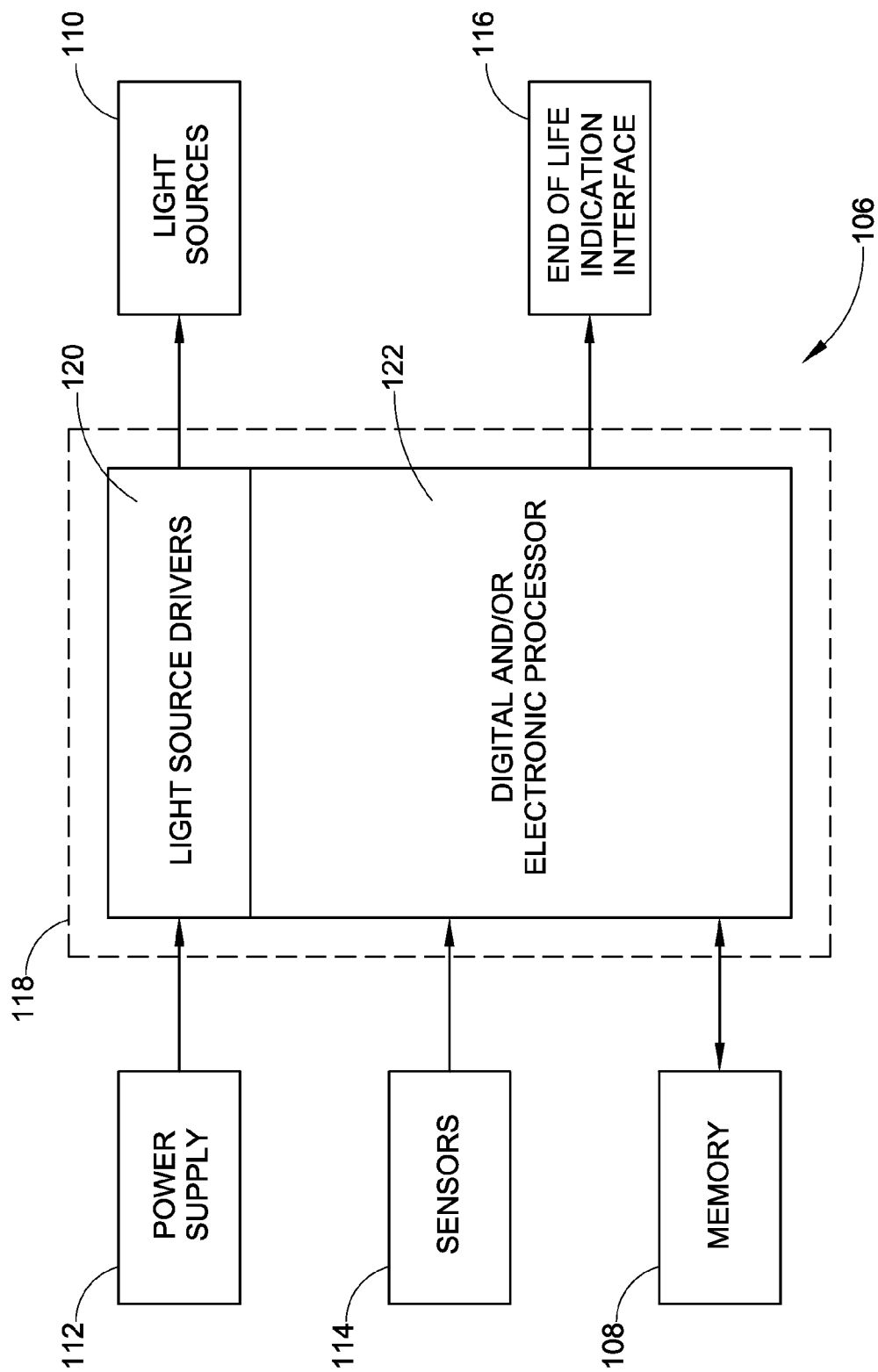

With reference to FIG. 2, a block diagram of the traffic lamp electronics 106 is provided. As will be seen, the traffic lamp electronics 106 advantageously facilitate one or more of traffic lamp protection, end-of-life notification, and constant light output. The traffic lamp electronics 106 include memory 108 comprising one or more memory modules, one or more light sources 110, a power supply 112, one or more sensors 114, an end of life indication interface 116, a controller 118, and the like. However, more or less components are equally amenable.

The memory 108 stores personality parameters for the traffic lamp 100. Personality parameters define the operating characteristics of the traffic lamp 100, such as output current to the light sources 110, and/or enable and/or disable features of the traffic lamp 100. Additionally or alternatively, the memory 108 stores log data associated with one or more operating parameters. Operating parameters correspond to operating conditions of the traffic lamp 100, such as operating time. The memory 108 suitably includes one or more of a magnetic disk or other magnetic storage medium; an optical disk or other optical storage medium; read-only memory (ROM), Electrically Erasable Programmable Read-Only Memory (EEPROM), or other electronic memory device or chip or set of operatively interconnected chips; and the like. Further, the memory 108 suitably stores the log data and/or the personality parameters such that they persist on the memory 108 notwithstanding that power may be unavailable.

The light sources 110 generate light for the traffic lamp 100. Typically, the light sources 110 include one or more LEDs. However, it is contemplated that the light sources 110 may include one or more fluorescent tubes, halogen bulbs, and the like. Suitably, the colors of the light sources 110 are one or more of yellow, green and red. In certain embodiments, the light sources 110 are selected to control Correlated Color Temperature (CCT), Color Rendering Index (CRI), and other like characteristics of light.

The power supply 112 receives power from the external source and distributes said power to the constituent components of the traffic lamp electronics 106. The input voltage to the power supply 112 is typically an alternating current (AC) voltage, but it is contemplated that the received input voltage may be a direct current (DC) voltage. Further, the input voltage typically ranges from 0V to 265V and/or the input frequency typically ranges from 0 Hz to 150 Hz. Insofar as the received input voltage is AC, the power supply 112 converts it to DC. Although it is not shown, it is to be understood that the power supply 112 suitably includes one or more hardware components for distribution of the power to the traffic lamp electronics 106. These components may include, but are not limited to, one or more of a rectifier, surge protection circuit, electromagnetic interference filter circuit, one or more switching power supplies, a conflict monitor, one or more input fuses, a fuse blowout (FBO) circuit, a power factor correction power supply, and the like.

The sensors 114 measure one or more operating parameters, such as input voltage, input frequency, light source current, and the like, of the traffic lamp 100. However, suitably the sensors 114 measure at least the operating (i.e., internal) temperature of the traffic lamp 100. As noted above, temperature is an important operating parameter of the traffic lamp in that it affects the light output of the light sources 110. In certain embodiments, the sensors 114 include one or more of passive and/or active electronic circuits, thermistors, temperature sensors, and the like.

The end of life indication interface 116 generates end of life indication signals to one or more components of the traffic lamp electronics 106, such as one of the light sources 110, and/or one or more external components thereof, such as a traffic controller (not shown). It is contemplated that, in certain embodiments, the end of life indication signals are used for generating one or more of an audio and/or visual warning, enabling a fault light source, and the like. Suitably, the controller 118 controls the end of life indication interface 116, but it is contemplated that other components of the traffic lamp electronics 106 may do so.

The controller 118 controls the traffic lamp electronics 106 according to the personality parameters stored on the memory 108. As noted above, personality parameters define the operating characteristics of the traffic lamp 100 and/or enable and/or disable features of the traffic lamp 100. For example, the controller 118 may dim the light sources 110 according to a dimming personality parameter on the memory 108.

Additionally or alternatively, the controller 118 instructs one or more light source drivers 120 thereof as to the output current to provide to the light sources 110, so as to account for degradation factors. The light source drivers 120 typically convert the voltage received from the power supply 112 to a compatible level for the light source and feed a DC current to the light source. Degradation factors maintains a constant level of the light output of the light sources 110 and may include one or more of operating time of the traffic lamp 100, operating temperature of the traffic lamp 100, and the like. The instructions provided by the controller 118 suitably instruct the light source drivers 120 to use a calculated output current $I_{out}$ for the light sources 110, which may be defined as:

$$I_{out} = I_{nom} * f_{TH} * f_{De} \tag{1}$$

where $I_{nom}$ is the nominal output current to the light sources 110 and may be a personality parameter; $f_{TH}$ is a correction factor adjusting for temperature inside the traffic lamp 100; and $f_{De}$ is a correction factor adjusting for the age of the light sources 110, which is determined from log data on the memory 108.

The correction factors noted above may be determined through the use of a lookup table in which correction factors are indexed by operating parameter values and/or through a mathematical transfer function. In embodiments employing a lookup table, a correction factor may be determined by searching the lookup table for a record associated with a current value of an operating parameter. In certain embodiments, the lookup table may be stored on the memory 108 and/or precalculated by, for example, a manufacturer of the traffic lamp 100, an operator of the traffic lamp 100, or the like.

Additionally or alternatively, the controller 118 monitors and/or logs operating parameters of the traffic lamp 100. Operating parameters correspond to operating conditions of the traffic lamp 100 and may pertain to software and/or hardware functionality. Typically, operating parameters include one or more of: current personality parameters; a calculated output current to the light sources 110; a measured output current to the light sources 110; an input voltage to the traffic lamp 100 (i.e., the input voltage the power supply 112 receives from the external source); an input frequency to the traffic lamp 100 (i.e., the frequency the power supply 112 receives from the external source); the operating time of the traffic lamp 100; the temperature of the traffic lamp 100; and the like. The current personality parameters correspond to the personality parameters currently used by the traffic lamp electronics 106. As noted above, personality parameters define the operating characteristics of the traffic lamp 100 and/or enable and/or disable features of the traffic lamp 100. The operating time of the traffic lamp 100 suitably corresponds to the amount of time the light sources 110 and/or the traffic lamp electronics 106 have been in operation. In certain embodiments, the operating time of the light sources 110 and/or the traffic lamp electronics 106 includes one or more of the number of hours, the number of minutes, the number of seconds, the number of hundredths of a second, and the like.

The input voltage, in addition to being important to the calculated output current, is also important for determining whether the traffic lamp 100 should be ON or OFF. Namely, the input voltage of the traffic lamp 100 will generally be variable, whereby the traffic lamp 100 generally needs to be capable of working across a wide range of input voltages. For example, in North America, the traffic lamp 100 must generally be ON from 80V to 135V; below 35V the traffic lamp 100 must generally be OFF; and from 35V to 80V the traffic lamp 100 can generally be ON or OFF. As another example, in Europe, the traffic lamp 100 must generally be ON from 120V to 265V; below 80V the traffic lamp 100 must generally be OFF; and from 80V to 120V the traffic lamp 100 can generally be ON or OFF.

Monitoring operating parameters may entail receiving data pertaining to one or more operating parameters of the traffic lamp 100 from one or more hardware and/or software components comprising the traffic lamp 100. For example, data pertaining to a state of any state machine implemented by the controller 118 may be received from a software component of the traffic lamp 100. As another example, data pertaining to the operating temperature of the traffic lamp 100 may be received from a temperature sensor of the sensors 114. The received data may include the present values of operating parameters and/or data necessary to calculate the present values of operating parameters.

Logging operating parameters of the traffic lamp 100 suitably entails writing values (calculated or otherwise) of one or more of the operating parameters to the memory 108. In certain embodiments, the values of operating parameters may overwrite previously written log data. For example, logging may entail maintaining extremes for different operating parameters, such as the maximum and/or minimum input voltages encountered. As another example, logging may entail maintaining the operating time of the traffic lamp 100. In other embodiments, the values of operating parameters may be written as a log entry indexed by time, where each log entry includes one or more operating parameters.

Additionally or alternatively, the controller 118 enters the traffic lamp 100 into a self-protected mode if a fault is detected while monitoring the operating parameters. For example, if the operating temperature of the traffic lamp 100 exceeds certain thresholds or maximums, the traffic lamp 100 may enter into the self-protected mode, thus preventing the traffic lamp 100 from overheating. An operator of the traffic lamp 100, a manufacturer of the traffic lamp 100, or the like, may set the thresholds and/or maximums. The self-protected mode reduces the power consumption of the traffic lamp 100 to a safe level and prevents the traffic lamp 100 from overheating Additionally or alternatively, the controller 118 generates an indication if the end of life of the traffic lamp 100 is detected. Suitably, the detection of the end of life includes consideration of at least the operating time of the traffic lamp 100. In certain embodiments, the end of life may be detected through the use of a model and/or heuristic approximating the life cycle of the traffic lamp 100. In such embodiments, the model and/or heuristics suitably take one or more operating parameters as input and output a determination as to whether the traffic lamp 100 has reached its end of life.

The indication suitably includes generating one or more signals to the end of life indication interface 116 informing it that the end of life (i.e., warrantee expire) of the traffic lamp 100 has been reached. The end of life indication interface 116 may then provide end of life indication signals to one or more components of the traffic lamp electronics 106, such as one of the light sources 110, and/or one or more external components thereof, such as a traffic controller. It is contemplated that, in certain embodiments, the end of life indication signals are used for generating an audio and/or visual warning, enabling a fault light source, and the like.

To carry out the above-noted functionality, the controller 118 generally includes a digital/electronic processor 122, such as a microprocessor, microcontroller, graphic processing unit (GPU), and the like. In such embodiments, the controller 118 suitably executes instructions embodying the above-noted functions using the processor 122. Suitably, the instructions are stored on the memory 108 of the traffic lamp 100. However, it is contemplated that the instructions are stored local to the processor 122 and one of ROM, EPROM, EEPROM, Flash memory, and the like. The controller 118 suitably communicates with the memory 108 via a digital communications protocol, such as I2C, 1 Wire, SPI, and the like. The communications protocol may be carried over one or more of a data bus, a communications network, and the like.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:
1. A traffic lamp comprising:
one or more light sources;
one or more temperature sensors that measure an internal ambient temperature of the entire traffic lamp, wherein the temperature sensors are located on or proximately close to a traffic lamp power supply;
one or more memory modules; and
a controller internal to the traffic lamp that actively monitors one or more operating parameters of the traffic lamp including operating usage of the traffic lamp during its active power cycle and internal power supply ambient temperature, compares these values to pre-determined thresholds, and enters the traffic lamp into a self-protected mode, wherein the controller changes internal operating parameters and behavior to enable continuous operation of the traffic lamp and to protect itself from damaging abnormal operating conditions, and once abnormal operating conditions are removed, revert the traffic lamp to its normal intended operating parameters and behavior.

2. The traffic lamp of claim 1, wherein one of the operating parameters is operating temperature.

3. The traffic lamp of claim 1, wherein the controller is configured to log operating time of the traffic lamp to one or more of the memory modules.

4. The traffic lamp of claim 3, wherein one of the operating parameters is operating time of the traffic lamp.

5. The traffic lamp of claim 1, wherein a fault is detected if a current value of one of the operating parameters exceeds a threshold.

6. The traffic lamp of claim 5, wherein the threshold is a maximum operating temperature.

7. The traffic lamp of claim 1, wherein the self-protected mode reduces the traffic lamp power consumption to a safe level and prevents the traffic lamp from overheating.

8. A traffic lamp comprising:
one or more light sources;
one or more memory modules;
an end of life indication interface; and
a controller internal to the traffic lamp that actively monitors the operating time of the entire traffic lamp, generates a special indication signal through the end of life indication interface if end of life is detected with the traffic lamp, wherein end of life is determined based on the one or more operating parameters, and wherein the traffic lamp is configured to operate until removed from service.

9. The traffic lamp of claim 8, wherein end of life is detected if operating time of the traffic lamp exceeds a maximum operating time.

10. The traffic lamp of claim 8, wherein end of life is detected if light output of the one or more light sources cannot be guaranteed.

11. The traffic lamp of claim 8, wherein the controller is configured to log operating time of the traffic lamp to one or more of the memory modules.

12. The traffic lamp of claim 11, wherein one of the operating parameters is operating time.

13. The traffic lamp of claim 8, wherein the indication includes controlling of one or more of an end of life indication LED, sending a signal, and enabling a light source.

14. A traffic lamp comprising:
one or more light sources;
one or more memory modules; and
a controller that monitors one or more operating parameters of the traffic lamp, wherein the operating parameters include the internal ambient temperature of the entire traffic lamp and total operating time of the traffic lamp, and logs at least one of these one or more operating parameters to at least one of the memory modules, wherein said controller adjusts light output of the one or more light sources to correct for one or more degradation factors based on the internal ambient temperature of the entire traffic lamp and total operating time of the traffic lamp to maintain a constant light output level of the light sources.

15. The traffic lamp of claim 14, wherein the degradation factors include at least one of operating time and operating temperature.

16. The traffic lamp of claim 14, wherein one of the degradation factors is operating time.

17. The traffic lamp of claim 14, wherein the controller adjusts light output by controlling output current to the one or more light sources.

* * * * *